United States Patent
Dai et al.

(10) Patent No.: US 8,432,875 B2
(45) Date of Patent: Apr. 30, 2013

(54) METHOD AND DEVICE FOR SENDING INFORMATION IN A PHYSICAL UPLINK CONTROL CHANNEL

(75) Inventors: Bo Dai, Shenzhen (CN); Shuqiang Xia, Shenzhen (CN); Peng Hao, Shenzhen (CN); Chunli Liang, Shenzhen (CN); Guanghui Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 449 days.

(21) Appl. No.: 12/811,466

(22) PCT Filed: Dec. 31, 2008

(86) PCT No.: PCT/CN2008/002165
§ 371 (c)(1),
(2), (4) Date: Jul. 1, 2010

(87) PCT Pub. No.: WO2009/086736
PCT Pub. Date: Jul. 16, 2009

(65) Prior Publication Data
US 2010/0290439 A1  Nov. 18, 2010

(30) Foreign Application Priority Data
Jan. 5, 2008  (CN) .......................... 2008 1 0001338

(51) Int. Cl.
*H04J 3/00* (2006.01)
(52) U.S. Cl.
USPC ............ 370/336; 370/337; 370/338; 370/498
(58) Field of Classification Search .................. None
See application file for complete search history.

(56) References Cited

U.S. PATENT DOCUMENTS
2007/0042797 A1  2/2007 Lee et al.
2008/0225791 A1* 9/2008 Pi et al. ......................... 370/330

FOREIGN PATENT DOCUMENTS
| | | |
|---|---|---|
| CN | 1606363 A | 4/2005 |
| CN | 1697355 A | 11/2005 |
| CN | 101222291 A | 7/2008 |
| WO | 2006059827 A1 | 6/2006 |

OTHER PUBLICATIONS

3GPP TSG TRAN WG#49-BIS, "UL ACK/NACK mapping relations". LG Electronics, Orlando, USA, Jun. 25-29, 2007, pp. 1-4.
3GPP TS 36,213 v8.0.0 3rd Generation Partnership Project: Technical Specification Group Radio Access Network; Evolved Universal Terrestrial Radio Access (E-UTRA); Physical layer procedures (Release 8) Sep. 2007 section 10.
International Search Report, Feb. 2009.
3GPP TSG RAN1 #51, Nov. 5-9, 2007, Jaju, Korea, Agenda 6.2.4, Qualcomm Europe, "UL Acknak Resource Allocation", Document for Discussion and Decision, 4 Pages.
3GPP TSG-RAN WG1#48, Feb. 12-16, 2007, St. Louis, Agenda 6.9.2, Nokia, "ACK/NACK Channel structure in E-UTRA TDD Downlink," Discussion and Decisio, 4 Pages.
TSG-RAN WG1 LTE TDD Ad Hoc, Apr. 17-20, 2007, Beijing, China, Agenda 3.13.1, Ericsson, "Uplink Transmission of ACK/NACK for E-UTRA TDD", Discussion and Decision, 4 Pages.

* cited by examiner

*Primary Examiner* — Faruk Hamza
*Assistant Examiner* — Tito Pham
(74) *Attorney, Agent, or Firm* — Banner & Witcoff, Ltd.

(57) ABSTRACT

The present invention discloses a method and device for sending a message in a physical uplink control channel. The present invention overcomes the problem that an index of the physical uplink control channel corresponding to a ACK/NACK message can not be represented implicitly in prior art by using the known downlink information, which includes an index of the control channel element where control signaling associated with downlink data is located and an index of a sub-frame where the downlink data is located. Therefore, the index of the physical uplink control channel where the ACK/NACK message associated with the downlink data is located can be represented and the ACK/NACK message can be sent in an appropriate physical uplink control channel.

16 Claims, 3 Drawing Sheets

METHOD AND DEVICE FOR SENDING INFORMATION IN A PHYSICAL UPLINK CONTROL CHANNEL

TECHNICAL FIELD

The present invention relates to the field of communication, and more particularly, to a method and device for sending a message in a physical uplink control channel (PUCCH).

TECHNICAL BACKGROUND

In a hybrid automatic repeat request method, a code sent by a sender is capable of not only error-detecting but also error-correcting to a certain extent. After a code word is received by an encoder at a receiver, its errors are detected first. If the errors are within the error-correcting capability of the code, then they are corrected automatically; if the errors are so many as to exceed the error-correcting capability of the code but they still can be detected, then the receiver sends a decision signal to the sender via a feedback channel to require the sender to retransmit information. In an orthogonal frequency division multiplex (OFDM) system, the correctness or incorrectness of transmission is indicated by an acknowledged (ACK) or non-acknowledged (NACK) control signaling in order to determine whether retransmission is required.

At present, it is specified in a long term evolution (LTE) that an ACK/NACK message associated with downlink data is transmitted in a physical uplink control channel. In a frequency division duplex (FDD) system, the proportion of uplink time slots equals to that of downlink times slots. In order to save signaling overhead, it is specified that an index of the physical uplink control channel corresponding to the ACK/NACK message is implicitly represented by a minimum index of a control channel element (CCE) where control signaling associated with downlink data is located.

A time division duplex (TDD) mode frame construct of the LTE system is provided, as shown in FIG. 1 (for convenience of description, this frame construct is referred to as frame construct hereinafter). In such frame construct, a wireless frame with a length of 10 ms is divided into two half-frames, and each half-frame is divided into 10 time slots (the indices of which are from 0 to 9) with a length of 0.5 ms, two time slots constituting one sub-frame with a length of 1 ms, and one half-frame containing 5 sub-frames (the indices of which are from 0 to 4). For short cyclic prefixes (CP) with a length of 5.21 us and 4.69 us, one time slot contains 7 symbols with a length of 66.7 us, where the length of the CP of the first symbol is 5.21 us and the length of the CP of the 6 remaining symbols is 4.69 us; for a long CP with a length of 16.67 us, one time slot contains 6 uplink/downlink symbols. In addition, configuration features of the sub-frames in such frame construct will be described below.

The sub-frame 0 is constantly used for downlink transmission.

The sub-frame 1 is a special sub-frame containing 3 special time slots, which are a downlink pilot time slot (DwPTS), a guard period (GP) and an uplink pilot time slot (UpPTS), respectively, in which:

- the DwPTS is used for downlink transmission and at least one orthogonal frequency division multiplex (OFDM) symbol is used for transmitting a primary-synchronization channel (P-SCH) signal;
- the GP is protection time and is not used for transmit any data; and
- the UpPTS is used for uplink transmission (as shown in FIG. 1).

There exists at least the following problem in prior art.

In the TDD system, since there are many configurations for the proportional relationship between the uplink time slot and downlink time slot, the case where the uplink time slots are unequal to the downlink time slots will occur. Thus, the index of the physical uplink control channel corresponding to the ACK/NACK message can not be represented implicitly by the minimum index of the CCE. Furthermore, the message can not be sent on an appropriate physical uplink control channel.

SUMMARY OF THE INVENTION

A technical problem to be solved by the present invention is to solve a problem that an index of a physical uplink control channel corresponding to an ACK/NACK message can not represented implicitly in the TDD system in prior art.

In order to solve the technical problem described above, the present invention provides a method for sending a message on a physical uplink control channel comprising the following steps:

acquiring an index k of a control channel element where control signaling associated with downlink data is located and an index i of a sub-frame where the downlink data is located;

calculating an index h of a physical uplink control channel corresponding to an ACK/NACK message and an index p of a uplink sub-frame where the ACK/NACK message is located using the index k and the index i; and sending the message in the physical uplink control channel corresponding to the index h and p.

Further, the method also has the following feature: the index h of the physical uplink control channel corresponding to the ACK/NACK message and the index p of the uplink sub-frame where the ACK/NACK message is located is calculated using the following equations:

$$M=[(D \times N)/U],$$

$$p=[(i \times N+k)/M],$$

$$h=i \times N+k-(p-1) \times M,$$

where N represents a maximum quantity of control channel elements contained in one downlink sub-frame, and U/D represents a proportional relationship between the uplink time slots and the downlink time slots.

Further, the method also has the following feature: the index h of the physical uplink control channel corresponding to the ACK/NACK message and the index p of the uplink sub-frame where the ACK/NACK message is located is calculated using the following equations:

$$M==[D/U]$$

$$p=[(i+1)/M]$$

$$h=k+(i-(p-1) \times M) \times N,$$

where N represents a maximum quantity of control channel elements contained in one downlink sub-frame, and U/D represents a proportional relationship between the uplink time slots and the downlink time slots.

Further, the method also has the following feature: the index k is a minimum index or a maximum index among indices of all of the control channel elements.

Further, the method also has the following feature: the proportional relationship U/D is a proportional relationship between the uplink time slots and the downlink time slots in a wireless frame or a proportional relationship between the uplink time slots and the downlink time slots in an half-frame.

In order to solve the technical problem described above, the present invention also provides a device for sending a message in a physical uplink control channel comprising:

an acquisition module configured to acquire an index k of a control channel element where a control signaling associated with downlink data is located and an index of a sub-frame where the downlink data is located;

a calculation module configured to calculate an index h of a physical uplink control channel corresponding to an ACK/NACK message and an index p of a uplink sub-frame where the ACK/NACK message is located using the index k and the index i; and a sending module configured to send the message in the physical uplink control channel corresponding to the index h and p.

Further, the device also has the following feature: the calculation module uses the following equations to calculate the index h of the physical uplink control channel corresponding to the ACK/NACK message and the index p of the uplink sub-frame where the ACK/NACK message is located:

$$M=[(D \times N)/U],$$

$$p=[(i \times N+k)/M],$$

$$h=i \times N+k-(p-1) \times M,$$

where N represents a maximum quantity of control channel elements contained in one downlink sub-frame, and U/D represents a proportional relationship between the uplink time slots and the downlink time slots.

Further, the device also has the following feature: the calculation module uses following equations to calculate the index h of the physical uplink control channel corresponding to the ACK/NACK message and the index p of the uplink sub-frame where the ACK/NACK message is located:

$$M=[D/U],$$

$$p=[(i+1)/M],$$

$$h=k+(i-(p-1) \times M) \times N,$$

Where N represents a maximum quantity of control channel elements contained in one downlink sub-frame, and U/D represents a proportional relationship between the uplink time slot and the downlink time slot.

Further, the device also has the following feature: the index k is a minimum index or a maximum index among indices of all of the control channel elements.

Further, the device also has the following feature: the proportional relationship U/D is a proportional relationship between the uplink time slots and the downlink time slots in a wireless frame or a proportional relationship between the uplink time slots and the downlink time slots in an half-frame.

The present invention overcomes the problem that the index of the physical uplink control channel corresponding to the ACK/NACK message can not be represented implicitly in prior art by using known downlink information, which includes the index k of the control channel element where a control signaling associated with downlink data is located and the index i of a sub-frame where the downlink data is located. Therefore, the index of the physical uplink control channel where the ACK/NACK message associated with the downlink data is located may be represented and the ACK/NACK message may be sent on an appropriate physical uplink control channel.

PREFERRED EMBODIMENTS OF THE INVENTION

The core idea of the present invention is to represent implicitly an index of a physical uplink control channel corresponding to an ACK/NACK message and an index of the corresponding uplink sub-frame by using known downlink information, where the known downlink information adopts an index of a control channel element where control signaling associated with downlink data is located and an index of a sub-frame where the downlink data is located.

The present invention will be described in detail below with reference to the accompanying drawings and in conjunction with specific embodiments.

Figure 2:
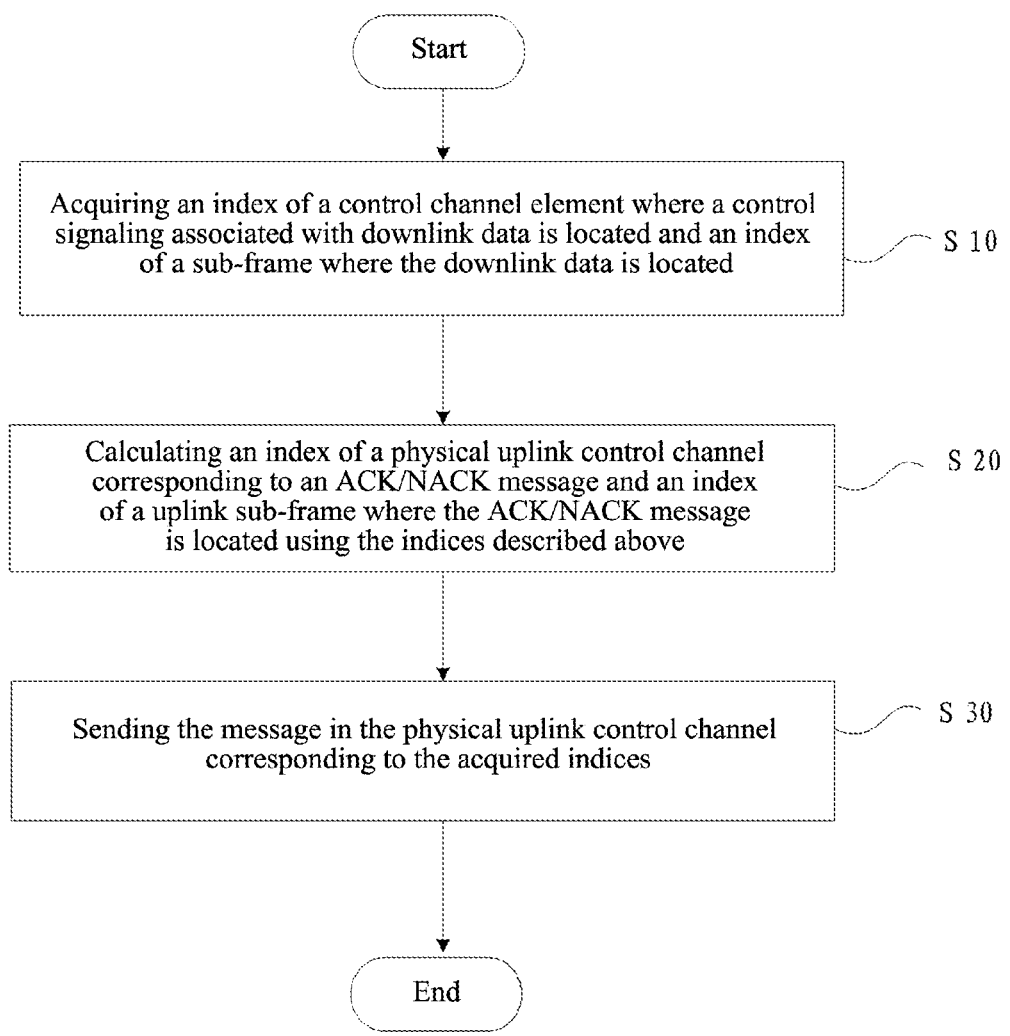
FIG. 2 illustrates a flow chart of a method for sending a message in a physical uplink control channel in accordance with an embodiment of the present invention.

FIG. 2 illustrates a flow chart of a method for sending a message in a physical uplink control channel in accordance with an embodiment of the present invention. The method comprises the following steps:

step S10: acquiring an index k of a control channel element where control signaling associated with downlink data is located and an index i of a sub-frame where the downlink data is located;

step S20: calculating an index h of a physical uplink control channel corresponding to an ACK/NACK message and an index p of a uplink sub-frame where the physical uplink control channel is located using the index k and the index i; and step S30: sending the message in the physical uplink control channel corresponding to the index h and p.

Both the index k of the control channel element where the control signaling associated with the downlink data is located and the index i of the sub-frame where the downlink data is located are known downlink information.

The method in accordance with this embodiment overcomes the problem that the index of the physical uplink control channel corresponding to the ACK/NACK message can not be represented implicitly in prior art by using the known downlink information, which represents implicitly the index of the physical uplink control channel corresponding to the ACK/NACK message associated with downlink data and the index of the corresponding uplink sub-frame. Therefore, the index of the physical uplink control channel where the ACK/NACK message associated with the downlink data is located may be represented and the ACK/NACK message may be sent in an appropriate physical uplink control channel. The method may reduce signaling overhead and may be applied to the case where the proportion of the uplink time slots is unequal to that of the downlink time slots.

Preferably, the index h of the physical uplink control channel corresponding to the ACK/NACK message and the index p of the uplink sub-frame where the ACK/NACK message is located are calculated using following equations:

$$M=[(D \times N)/U] \quad (1)$$

$$p=[(i \times N+k)/M] \quad (2)$$

$$h=i \times N+k-(p-1) \times M \quad (3)$$

where N represents a maximum quantity of control channel elements contained in one downlink sub-frame, and U/D represents a proportional relationship between the uplink time slots and the downlink time slots.

Preferably, the index h of the physical uplink control channel corresponding to the ACK/NACK message and the index p of the uplink sub-frame where the ACK/NACK message is located are calculated using following equations:

$$M=[D/U] \quad (4)$$

$$p=[(i+1)/M] \quad (5)$$

$$h=k+(i-(p-1)\times M)\times N \quad (6)$$

where N represents a maximum quantity of control channel elements contained in one downlink sub-frame, and U/D represents a proportional relationship between the uplink time slots and the downlink time slots.

Preferably, the index k is a minimum index or a maximum index among indices of all of the control channel elements.

Preferably, the proportional relationship U/D is a proportional relationship between the uplink time slots and the downlink time slots in a wireless frame or a proportional relationship between the uplink time slots and the downlink time slots in an half-frame.

Figure 1:
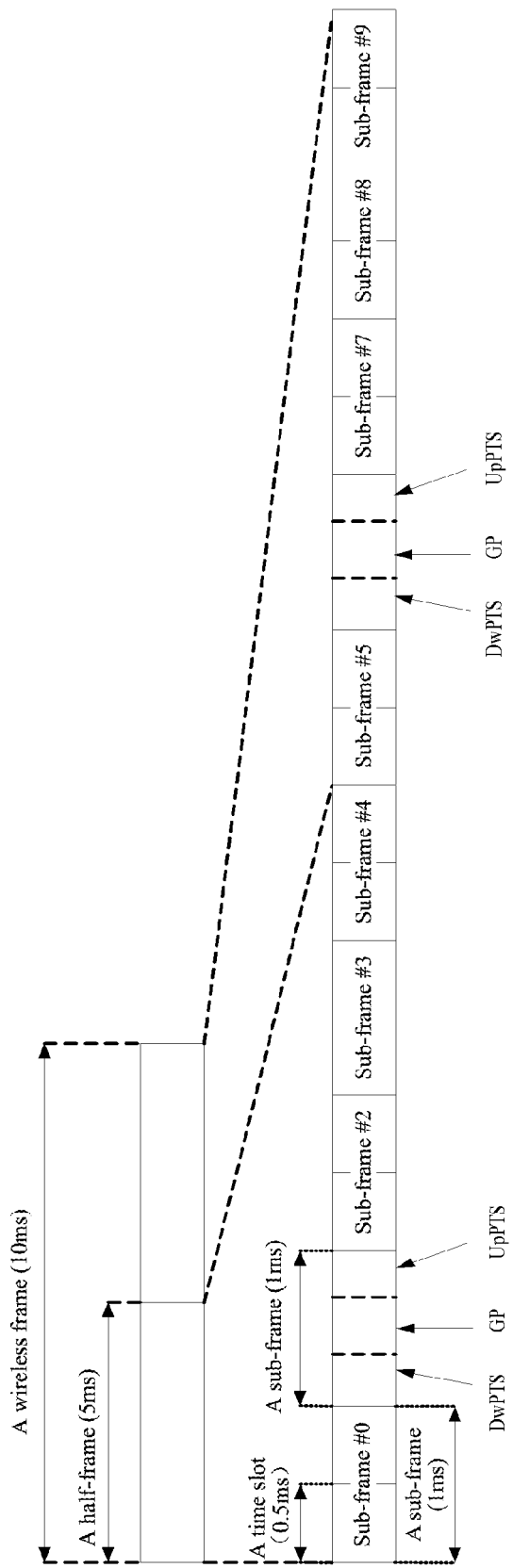
FIG. 1 illustrates a frame construct of the LTE TDD system.

Taking a 3GPP LTE TDD system as an example, the duration of one wireless frame is 10 ms and the duration of one half-frame is 5 ms, as shown in FIG. 1. Assuming that the maximum quantity of CCEs contained in one downlink sub-frame is N and the proportional relationship between the uplink time slots and the downlink time slots in the wireless frame is U/D.

In the wireless frame, all the downlink sub-frames, which are indexed from 0, are arranged in sequence. In the $i^{th}$ downlink sub-frame, the index of the CCE where the control signaling associated with the data received by a target user is located is k, and the ACK/NACK message returned by the target user in response to the received data is sent in the physical uplink control channel, the index of which is h, in the $p^{th}$ uplink sub-frame.

Method 1

The quantities of the uplink sub-frames and downlink sub-frames are determined according to the proportional relationship between the uplink time slot and the downlink time slot. Then, the CCEs of all the downlink sub-frames are connected in series according to the order in which the sub-frames are indexed. Then, these CCEs are divided into a number of groups according to the quantity of the uplink sub-frames, with each group corresponding to one uplink sub-frame. Each group may contain M CCEs and indices of the CCEs in the group correspond to indices of the physical uplink control channels of the target uplink sub-frames.

Thus, $M=[D/U]$, $p=[(i\times N+k)/M]$ and $h=i\times N+k-(p-1)\times M$.

Method 2

First, the corresponding relationship between the downlink sub-frames and the uplink sub-frames is established. Then, the CCEs in the downlink sub-frames mapped to the corresponding uplink sub-frames are united in sequence to be indexed such that all of the indices of the CCEs in these downlink sub-frames correspond to the indices of the physical uplink control channels of the target uplink sub-frames. One uplink sub-frame may correspond to M downlink sub-frames.

Thus, $M=[D/U]$, $p=[(i+1)/M]$ and $h=k+(i-(p-1)\times M)\times N$.

A variety of variations may be made to the implementation method described above, as long as that the ACK/NACK message is sent on which physical uplink control channel can be known based on the index i and k.

Figure 3:
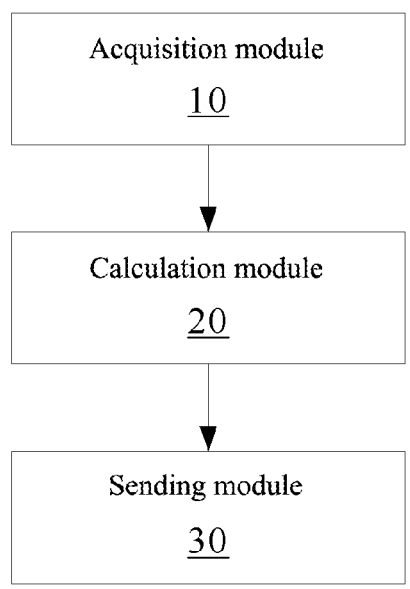
FIG. 3 illustrates a block diagram of a device for sending a message in a physical uplink control channel in accordance with an embodiment of the present invention.

FIG. 3 illustrates a block diagram of a device for sending a message in a physical uplink control channel in accordance with an embodiment of the present invention. The device comprises:

an acquisition module 10 configured to acquire an index k of a control channel element where control signaling associated with downlink data is located and an index i of a sub-frame where the downlink data is located;

a calculation module 20 configured to calculate an index h of a physical uplink control channel corresponding to an ACK/NACK message and an index p of a uplink sub-frame where the ACK/NACK message is located using the index k and the index i; and a sending module 30 configured to send the message on the physical uplink control channel corresponding to the index h and p.

Preferably, the calculation module uses the following equations to calculate the index h of the physical uplink control channel corresponding to the ACK/NACK message and the index p of the uplink sub-frame where the physical uplink control channel is located:

$$M=[(D\times N)/U] \quad (1)$$

$$p=[(i\times N+k)/M] \quad (2)$$

$$h=i\times N+k-(p-1)\times M \quad (3)$$

where N represents a maximum quantity of control channel elements contained in one downlink sub-frame, and U/D represents a proportional relationship between the uplink time slots and the downlink time slots.

Preferably, the calculation module uses the following equations to calculate the index h of the physical uplink control channel corresponding to the ACK/NACK message and the index p of the uplink sub-frame where the ACK/NACK message is located:

$$M=[D/U] \quad (4)$$

$$p=[(i+1)/M] \quad (5)$$

$$h=k+(i-(p-1)\times M)\times N \quad (6)$$

where N represents a maximum quantity of control channel elements contained in one downlink sub-frame, and U/D represents a proportional relationship between the uplink time slots and the downlink time slots.

Preferably, the index k is a minimum index or a maximum index among indices of all of the control channel elements.

Preferably, the proportional relationship U/D is a proportional relationship between the uplink time slots and the downlink time slots in a wireless frame or a proportional relationship between the uplink time slots and the downlink time slots in an half-frame.

The device in accordance with the above embodiment overcomes the problem that the index of the physical uplink control channel corresponding to the ACK/NACK message can not be represented implicitly in prior art by using the known downlink information, which includes the index k of the control channel element where control signaling associated with the downlink data is located and the index i of the sub-frame where the downlink data is located. Therefore, the index of the physical uplink control channel where the ACK/NACK message associated with the downlink data is located can be represented and the ACK/NACK message can be sent on in appropriate physical uplink control channel.

It can be seen from the above description that the present invention provides a new implicit relation representation method for the time division duplex system, in which the index of the physical uplink control channel where the ACK/NACK message associated with the downlink data is located is represented. The method may reduce signaling overhead and may be applied to the case where the proportion of the uplink time slots is unequal to that of the downlink time slots.

Obviously, it should be understood by those skilled in the art that each module or each step described in the present invention can be implemented by general-purpose computing devices and can be integrated into a single computing device or distributed in a network composed of a plurality of computing devices. Alternatively, they can be implemented using program codes that are executable to the computing devices. Therefore, they may be stored in storage devices to be executed by the computing devices, or they may be made into various integrate circuit modules or a number of modules or steps of them may be made into a single integrate circuit module so as to be implemented. Thus, the present invention is not limited to any particular combination of hardware and software.

Although the present invention is described in conjunction with specific embodiments, modifications and variations may be made to the present invention by those skilled in the art without departing from the spirit or scope of the present invention. Such modifications and variations are regarded as within the scope of the present invention and the appended claims.

INDUSTRIAL APPLICABILITY

The present invention provides a method and device for sending a message in a physical uplink control channel. The present invention overcomes the problem that an index of the physical uplink control channel corresponding to a ACK/NACK message can not be represented implicitly in prior art by using the known downlink information, which includes an index of the control channel element where control signaling associated with downlink data is located and an index of a sub-frame where the downlink data is located. Therefore, the index of the physical uplink control channel where the ACK/NACK message associated with the downlink data is located may be represented and the ACK/NACK message may be sent in an appropriate physical uplink control channel. The method can reduce signaling overhead and can be applied to the case where the proportion of the uplink time slots is unequal to that of the downlink time slots.

What we claim is:

1. A method for sending a message on a physical uplink control channel comprising the following steps of:
    establishing a mapping relation from indices of control channel elements and indices of downlink sub-frames to indices of uplink sub-frames and indices of physical uplink control channel utilizing a proportional relationship between uplink time slots and downlink time slots;
    acquiring an index k of a control channel element where a control signaling associated with downlink data is located and an index i of a sub-frame where the downlink data is located;
    calculating an index h of a physical uplink control channel corresponding to an ACK/NACK message and an index p of a uplink sub-frame where the ACK/NACK message is located using the index k, index i and the mapping relation; and
    sending the message in the physical uplink control channel corresponding to the index h and p;
    wherein the step of establishing the mapping relation comprises:
    dividing the control channel elements of all the downlink sub-frames into a number of groups according to a quantity of the uplink sub-frames, with each group mapping to one uplink sub-frame, mapping indices of the control channel elements in each group to indices of the physical uplink control channels of corresponding uplink sub-frames; or
    mapping indices of the downlink sub-frames to the uplink sub-frames according to the proportional relationship, mapping the control channel elements in the downlink sub-frames mapped to a same uplink sub-frame to the indices of the physical uplink control channels of the same uplink sub-frame.

2. The method according to claim 1, wherein the index h of the physical uplink control channel corresponding to the ACK/NACK message and the index p of the uplink sub-frame where the ACK/NACK message is located is calculated using the following equations:

$$M=\lceil (D \times N)/U \rceil,$$

$$p=\lceil (i \times N+k)/M \rceil,$$

$$h=i \times N+k-(p-1) \times M,$$

where N represents a maximum quantity of control channel elements contained in one downlink sub-frame, and U/D represents a proportional relationship between the uplink time slots and the downlink time slots.

3. The method according to claim 2, wherein the proportional relationship U/D is a proportional relationship between the uplink time slots and the downlink time slots in a wireless frame or a proportional relationship between the uplink time slots and the downlink time slots in an half-frame.

4. The method according to claim 2, wherein the index k is a minimum index or a maximum index among indices of all of the control channel elements.

5. The method according to claim 1, wherein the index h of the physical uplink control channel corresponding to the ACK/NACK message and the index p of the uplink sub-frame where the ACK/NACK message is located using the following equations:

$$M=\lceil D/U \rceil,$$

$$p=\lceil (i+1)/M \rceil,$$

$$h=k+(i-(p-1) \times M) \times N,$$

where N represents a maximum quantity of control channel elements contained in one downlink sub-frame, and U/D represents a proportional relationship between the uplink time slots and the downlink time slots.

6. The method according to claim 5, wherein the index k is a minimum index or a maximum index among indices of all of the control channel elements.

7. The method according to claim 5, wherein the proportional relationship U/D is a proportional relationship between the uplink time slots and the downlink time slots in a wireless frame or a proportional relationship between the uplink time slots and the downlink time slots in a half-frame.

8. The method according to claim 1, wherein the index k is a minimum index or a maximum index among indices of all of the control channel elements.

9. A device for sending a message in a physical uplink control channel comprising:
   an acquisition module configured to
   establish a mapping relation from indices of control channel elements and indices of downlink sub-frames to indices of uplink sub-frames and indices of physical uplink control channel utilizing a proportional relationship between uplink time slots and downlink time slots; and acquire an index k of a control channel element where a control signaling associated with downlink data is located and an index i of a sub-frame where the downlink data is located;
   a calculation module configured to calculate an index h of a physical uplink control channel corresponding to an ACK/NACK message and an index p of a uplink sub-frame where the ACK/NACK message is located using the index k, the index i and the mapping relation; and
   a sending module configured to send the message in the physical uplink control channel corresponding to the index h and p;
   wherein the acquisition module is configured to utilize the following means to establish the mapping relation:
   dividing the control channel elements of all the downlink sub-frames into a number of groups according to a quantity of the uplink sub-frames, with each group mapping to one uplink sub-frame, mapping indices of the control channel elements in each group to indices of the physical uplink control channels of corresponding uplink sub-frames; or
   mapping indices of the downlink sub-frames to the uplink sub-frames according to the proportional relationship, mapping the control channel elements in the downlink sub-frames mapped to a same uplink sub-frame to the indices of the physical uplink control channels of the same uplink sub-frame.

10. The device according to claim 9, wherein the calculation module is configured to use the following equations to calculate the index h of the physical uplink control channel corresponding to the ACK/NACK message and the index p of the uplink sub-frame where the ACK/NACK message is located:

$$M=[(D \times N)/U],$$

$$p=[(i \times N+k)/M],$$

$$h=i \times N+k-(p-1) \times M,$$

where N represents a maximum quantity of control channel elements contained in one downlink sub-frame, and U/D represents a proportional relationship between the uplink time slots and the downlink time slots.

11. The device according to claim 10, wherein the proportional relationship U/D is a proportional relationship between the uplink time slots and the downlink time slots in a wireless frame or a proportional relationship between the uplink time slots and the downlink time slots in a half-frame.

12. The device according to any one of claim 10, wherein the index k is a minimum index or a maximum index among indices of all of the control channel elements.

13. The device according to claim 9, wherein the calculation module is configured to use following equations to calculate the index h of the physical uplink control channel corresponding to the ACK/NACK message and the index p of the uplink sub-frame where the ACK/NACK message is located:

$$M=[D/U],$$

$$p=[(i+1)/M],$$

$$h=k+(i-(p-1) \times M) \times N,$$

where N represents a maximum quantity of control channel elements contained in one downlink sub-frame, and U/D represents a proportional relationship between the uplink time slot and the downlink time slot.

14. The device according to claim 13, wherein the index k is a minimum index or a maximum index among indices of all of the control channel elements.

15. The device according to claim 13, wherein the proportional relationship U/D is a proportional relationship between the uplink time slots and the downlink time slots in a wireless frame or a proportional relationship between the uplink time slots and the downlink time slots in a half-frame.

16. The device according to claim 9, wherein the index k is a minimum index or a maximum index among indices of all of the control channel elements.

* * * * *

UNITED STATES PATENT AND TRADEMARK OFFICE
CERTIFICATE OF CORRECTION

PATENT NO.       : 8,432,875 B2  
APPLICATION NO. : 12/811466  
DATED            : April 30, 2013  
INVENTOR(S)      : Dai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Eighth Day of September, 2015

Michelle K. Lee
*Director of the United States Patent and Trademark Office*